United States Patent [19]

Nakase et al.

[11] Patent Number: 4,698,490

[45] Date of Patent: Oct. 6, 1987

[54] OPTICAL CODE READER

[75] Inventors: Koji Nakase; Hiroaki Sasaki, both of Furukawa, Japan

[73] Assignee: Alps Electric Co., Ltd., Japan

[21] Appl. No.: 838,288

[22] Filed: Mar. 10, 1986

[30] Foreign Application Priority Data

Mar. 8, 1985 [JP] Japan .............................. 60-33007[U]

[51] Int. Cl.⁴ ................................................ G06F 7/10
[52] U.S. Cl. .................................................... 235/472
[58] Field of Search .......................................... 235/472

[56] References Cited

U.S. PATENT DOCUMENTS 4,475,153 10/1984 Kihara ........................... 235/472 X Primary Examiner—Harold I. Pitts
Attorney, Agent, or Firm—Guy W. Shoup

[57] ABSTRACT

A cap which is in contact with an objective is fixed at the end part of case which encases a sensor, etc. Therefore, error is not generated in an optical bar code reader between the end part of cap which is in contact with the bar code given on the surface of paper and the end point of sensor.

3 Claims, 4 Drawing Figures

OPTICAL CODE READER

BACKGROUND OF THE INVENTION

1. Field of the Invention

The present invention relates to an optical code reader, and more particularly to a scanner which scans bar codes given on the surface of paper.

2. Description of the Prior Art

As a bar code scanner of this type, those shown in FIG. 3 and FIG. 4 are already known. Namely, in these figures, numeral 1 represents a lower case; 2, an upper case which encases the scanner mechanism by engaging with said lower case. At the upper surface of this upper case 2, a window hole 4 is formed in order to allow a switching operation body 3 to be exposed to the outside.

Numeral 5 represents a sensor which is held at the front end by the lower case 1 and the upper case 2. This sensor 5 provides, as shown in FIG. 4, the vertical split type base bodies 5a, 5b and the end point formed by such base bodies 5a, 5b is tapered with the end point designed smaller in diameter in order to hold a ball lens 6. Numeral 7 represents an optical fiber of which end corresponds to to the ball lens 6 and rear end is branched in the form of letter Y. At the branching end of this fiber 7, an LED which will become a light emitting element and a phototransistor which will become a light sensing element are respectively arranged.

Moreover, numeral 8 represents a stopper which engages with the lower case 1 and the upper case 2 and fixes the end points of them. This stopper 8 is provided with a through hole 8a at the center thereof allowing the end part of sensor 5 to pass through. At the end front end of this stopper 8, a cap 9 having the almost conic external shape is fixed by threading. The end point of sensor 5 is housed within this cap 9. A small hole 9a for allowing the light to pass is formed at the end point of the cap 9 and the ball lens 6 of sensor 5 is placed therein.

Numeral 10 represents a circuit substrate and numeral 11 respresents a wire.

However, the scanner of the prior art uses many components. Therefore, size allowance of such components are added while the components are sequentially assembled and finally it is very difficult to obtain a high accuracy of the distance between the end point of sensor and the end point of cap which will be in contact with the surface of paper.

SUMMARY OF THE INVENTION

It is an object of the present invention to eliminate such disadvantages of the prior art described above and provide an optical code reader which does not generate error between the end point of cap which is in contact with the bar codes on the surface of paper and the end pont of sensor.

In brief and in accordance with one characteristic aspect of the present invention, a cap which will be in contact with an target is provided, in view of attaining the object described above, at the end point of case which encases a sensor, etc.

The novel features which are believed to be characteristic of the invention, both as to organization and method of operation, together with further objects and advantages thereof, will be better understood from the following description considered in connection with the accompanying drawings. It is to be understood, however, that the drawings are for the purpose of illustration and description only and are not intended as a definition of the limits of the invention.

DESCRIPTION OF THE PREFERRED EMBODIMENT

An embodiment of the present invention will be described with respect to accompanying drawings.

Figure 1:
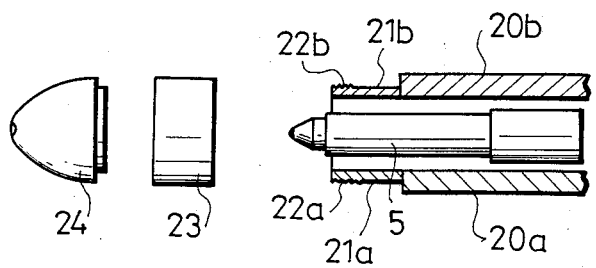
FIG. 1 is a side elevation of sectional view of principal portion of an optical code reader to which the present invention is applied.
Figure 2:
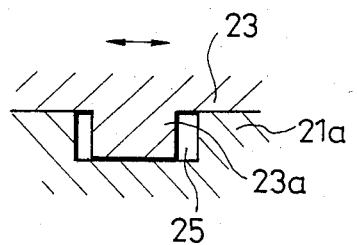
FIG. 2 is a sectional view of principal portion illustrating the coupling condition of the stopper and fixing part.
Figure 3:
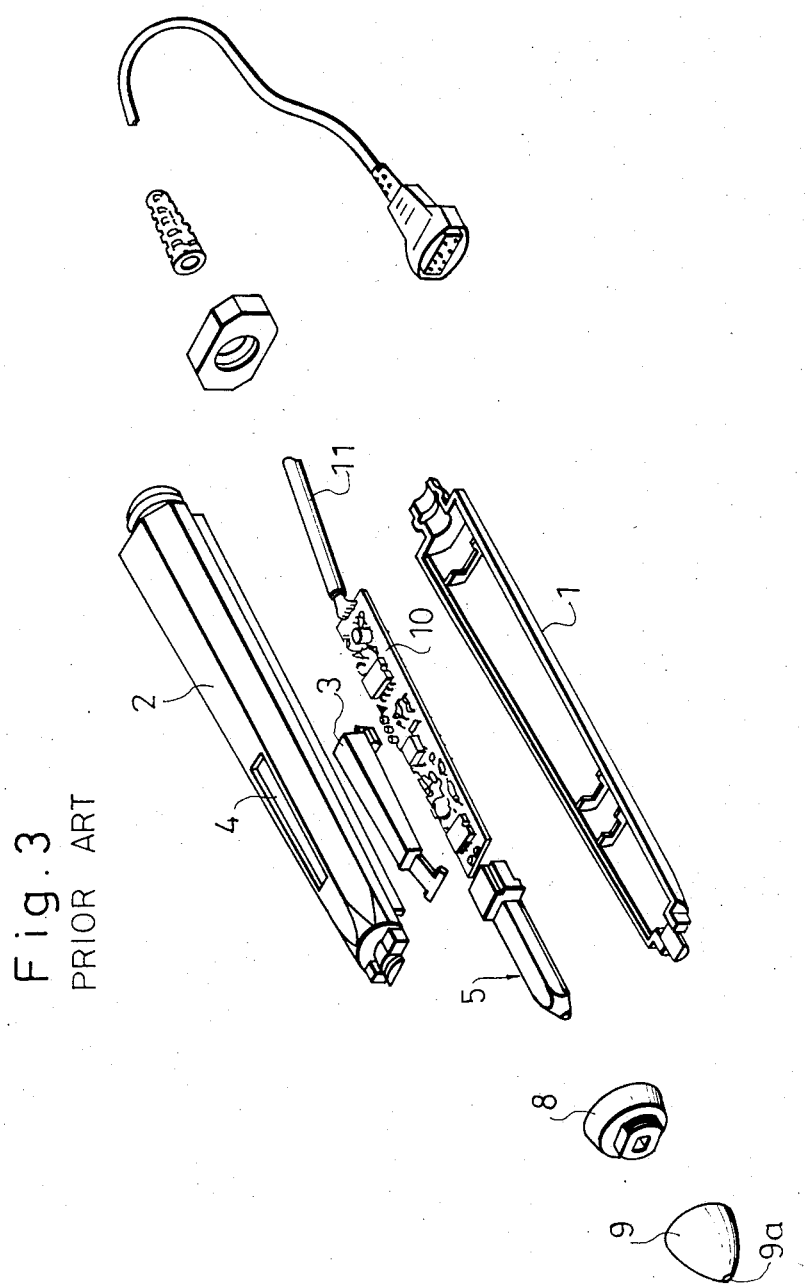
FIG. 3 is a perspective view of disassembled prior art.
Figure 4:
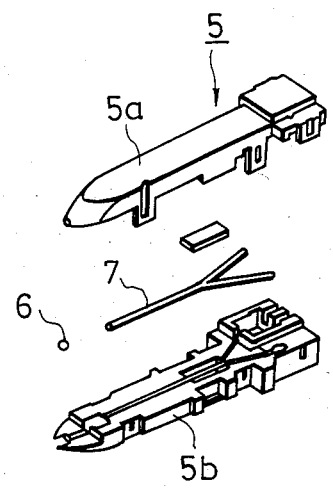
FIG. 4 is a perspective view of disassembled sensor in the prior art.

In FIG. 1, numeral 20a represents a lower case. This lower case 20a engages with an upper case 20b forming a scanner casing. As in the case of the prior art, a sensor 5 is encased and held at the end part of the lower case 20a and upper case 20b.

The fixing parts 21a, 21b at the front end of upper case 20b are formed longer than that of the prior art and the threaded parts 22a, 22b are also formed at the end point thereof. Moreover, a ring-shaped stopper 23 is engaged with the base side of such fixing part 21a in order to tightly fixing the lower case 20a and upper case 20b. At the threaded parts 22a, 22b of end part of fixing parts 21a, 21b, a conic cap 24 is engaged by threading.

In addition, a recessed part 25 is formed at the base of fixing parts 21a, 21b and a protrusion 23a provided at the internal surface of stopper 23 is engaged with said recesed part 25. The end point of this protrusion 23a collides with the bottom surface of recessed part 25. Width of protrusion 23a is narrower than the width of recessed part 25 and therefore the stopper 23 can move in the lateral direction within the range of width of the recessed part 25.

In the optical code reader of the present invention, since the cap 24 is directly coupled by threading with the threaded parts 22a, 22b of the lower case 20a and upper case 20b, the end point of sensor 5 collides accurately with the cap. Furthermore, since the stopper 23 can move in lateral on the occasion of threading the cap 24, close contact with the sensor 5 can be ensured.

As described above, according to the present invention, accuracy of distance between an optical system such as a ball lens provided at the end point of sensor and the cap can be obtained without generating error.

Although particular embodiment of the present invention has been described and illustrated herein, it is recognized that modifications and equivalents may readily occur to those skilled in the art. Consequently, it is intended that the claims may be interpreted to cover such modifications and equivalents and that the ivention be limited only thereby.

What is claimed is:

1. An optical code reader comprising a case which encases a sensor, a cap which is directly in contact with an objective and a stopper.

2. An optical code reader according to claim 1 wherein said cap is directly engaged by threading with the case in order to attain accurate contactness with the end point of sensor.

3. An optical code reader according to claim 1 wherein said stopper moves in lateral at the time of threading the cap and therefore close contact with sensor can be obtained.

* * * * *